United States Patent [19]

James

[11] Patent Number: 4,774,653
[45] Date of Patent: Sep. 27, 1988

[54] HYBRID HARDWARE/SOFTWARE METHOD AND APPARATUS FOR VIRTUAL MEMORY ADDRESS TRANSLATION USING PRIMARY AND SECONDARY TRANSLATION BUFFERS

[75] Inventor: David V. James, Palo Alto, Calif.

[73] Assignee: Hewlett-Packard Company, Palo Alto, Calif.

[21] Appl. No.: 763,485

[22] Filed: Aug. 7, 1985

[51] Int. Cl.[4] .......................................... G06F 12/06
[52] U.S. Cl. ...................................................... 364/200
[58] Field of Search ... 364/200 MS File, 900 MS File

[56] References Cited

U.S. PATENT DOCUMENTS

| 3,829,840 | 8/1974 | Burk et al. | 364/200 |
|---|---|---|---|
| 4,145,738 | 3/1979 | Inoue et al. | 364/200 |
| 4,206,503 | 6/1980 | Woods et al. | 364/200 |
| 4,356,549 | 10/1982 | Chueh | 364/200 |
| 4,386,402 | 5/1983 | Toy | 360/200 |
| 4,481,573 | 11/1984 | Fukunaga et al. | 364/200 |
| 4,612,612 | 9/1986 | Woffinden | 364/200 |
| 4,618,926 | 10/1986 | Kubo et al. | 364/200 |
| 4,638,426 | 1/1987 | Chang et al. | 364/200 |
| 4,654,790 | 3/1987 | Woffinden | 364/200 |
| 4,680,700 | 7/1987 | Hester et al. | 364/200 |
| 4,700,291 | 10/1987 | Saito | 364/200 |
| 4,710,894 | 12/1987 | Kubo et al. | 364/900 |

OTHER PUBLICATIONS

Computer Structures, Principles and Examples, D. Siewiorek, C. Bell, to Newell, McGraw Hill 1982, pp. 227-243.

M. Houdek, G. Mitchell, "Translating a Large Virtual Address", IBM System/38 Tech. Dev., IBM GS80-0237, 1978, pp. 22-25.

Primary Examiner—Raulfe B. Zache
Assistant Examiner—Eric Coleman
Attorney, Agent, or Firm—Jeffery B. Fromm; Douglas L. Weller

[57] ABSTRACT

A hybrid hardware/software implementation of a translation look-aside buffer (TLB) is provided which improves the efficiency of address translation in a computing system utilizing a virtually addressed memory. To access a physical memory location a processor first attempts to fetch a virtual-to-physical address translation from a primary TLB. If the address translation is not in the primary TLB, the processor attempts to fetch the address translation from a secondary TLB. If the address translation is not in the secondary TLB, a trap is generated, after which the processor searches a virtual address translation table for the address translation. Through the use of the present invention, complex hashing routines can be used to address entries in a virtual address translation table (VATT) within the system's physical memory, without increasing the complexity or significantly reducing the performance of the TLB fetch hardware.

16 Claims, 3 Drawing Sheets

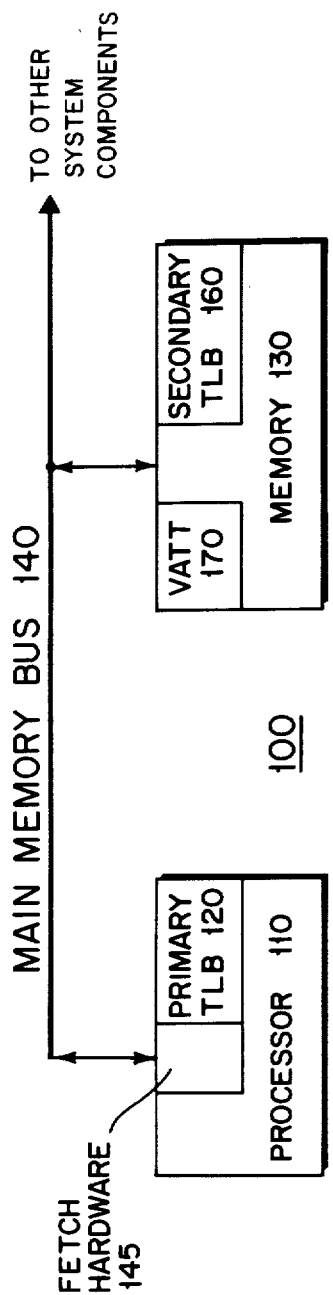
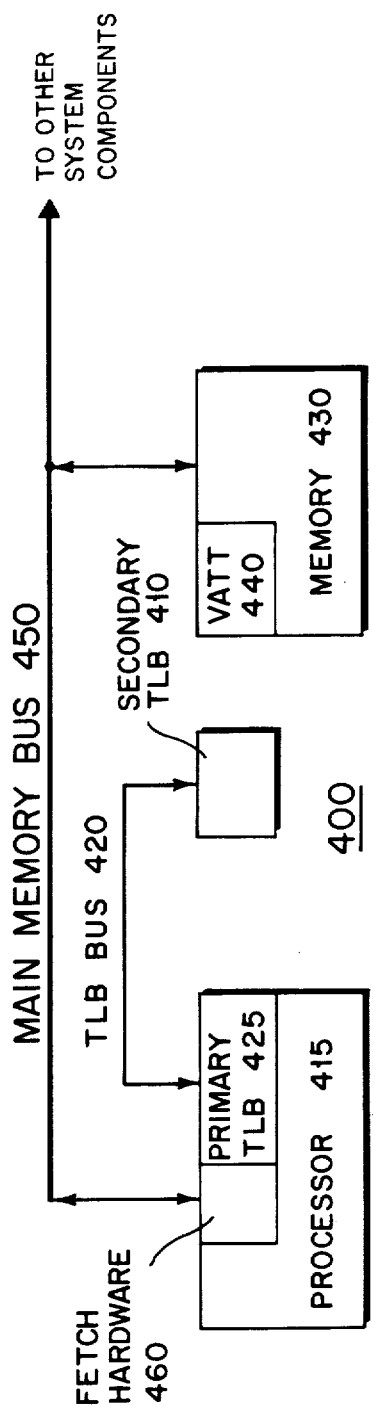
FIG 1
FIG 4

HYBRID HARDWARE/SOFTWARE METHOD AND APPARATUS FOR VIRTUAL MEMORY ADDRESS TRANSLATION USING PRIMARY AND SECONDARY TRANSLATION BUFFERS

BACKGROUND OF THE INVENTION

Modern computers frequently are constructed to permit user programs to execute code and fetch data from virtual memory addresses. However, data and memory modules must still be addressed with physical addresses. Therefore, hardware tables are used to translate virtual addresses into physical addresses. Such a hardware table is called a Virtual Address Translation Table (VATT).

In order to improve the efficiency of virtual to physical address translation, the VATT can include a section of high speed register memory of sufficient speed to execute instructions within a single processor cycle. Such a VATT is typically located at or near a high speed memory portion of the computer processor, in which memory is stored the most recently used address translation entries. This high speed memory section is referred to as a Translation Look-aside Buffer (TLB). Frequently, as programs progress, address translations will be found in the TLB, thus speeding up program execution. However, when an address translation is needed which is not in the TLB, a new table entry must be fetched by hardware from the VATT and loaded as an entry into the TLB.

Methods have been developed to increase the speed with which the TLB entries can be updated. One such method is the use of a simple organization of the entries within the VATT. For example, the VATT can be a simple table of sequential virtual memory addresses or a simple, hierarchical extension of a sequential table as explained in "Computer Structures: Principles and Examples" by D. Siewiorek, C. Bell, and A. Newell, McGraw Hill, 1982, pp. 227–243. Such simple organizations reduce the complexity and cost of the TLB fetch hardware, but significantly limit the structure of addresses within the VATT. More complex VATT formats are desirable because the virtual memory address space may be significantly larger than the actual physical address space implemented in hardware. Thus, the size of the sequential virtual address tables or the hierarchical structures containing such tables can exceed the size of the physical memory. The system must then swap portions of the tables between the physical memory and an alternate slow memory device such as a disc when access to entire table is required.

A more scalable approach is the use of hashing functions as described in "Translating a Large Virtual Address" by M. Houdek, G. Mitchell, IBM System 38 Technical Development, IBM GS80-0239, 1978, pp. 22–25 to translate virtual addresses in the TLB to physical addresses in the VATT. A hashing function is a pseudo-random method for efficient searching of the VATT for a translation table entry. Although the use of hashing functions is a flexible method for searching the VATT entries, it typically degrades the speed of the search, or increases the cost of TLB fetch hardware.

SUMMARY OF THE INVENTION

The present invention discloses a hybrid software and hardware mechanism for updating the TLB. A simple hardware configuration is used to implement the fetching of most TLB entries, which is the critical factor affecting the average speed of address translation. This hardware is then coupled to software which is used to implement the complex, but infrequently used portion of the TLB entry fetch operation.

The TLB is segmented into two hardware portions: a high speed primary TLB located at or near the processor, and a slower secondary TLB located within the processor or in physically addressed main memory. Virtual address translation is first attempted by the processor via the primary TLB, and if the virtual address translation is not contained within the primary TLB, hardware is used to fetch a new TLB entry from the secondary TLB. If the virtual address translation is not contained within the secondary TLB, a processor trap occurs to interrupt or halt the operation of the processor and software located within the processor is used to transfer the desired entry from the VATT to the secondary TLB or to both the primary and secondary TLB. Because the transfers from the VATT to the secondary TLB or from the VATT to the primary and secondary TLB are infrequent and occur in software, the complexity of the VATT does not significantly affect overall processor performance or add to system complexity. Therefore, the present invention is capable of supporting complex VATT structures, which reduces the memory storage required for the VATT without increasing the cost and complexity of the TLB fetch hardware.

BRIEF DESCRIPTION OF THE DRAWINGS

FIG. 1 shows a block diagram of the hybrid TLB fetch hardware according to a first embodiment of the present invention.

FIG. 4 shows a block diagram of the hybrid TLB fetch hardware according to a second embodiment of the present invention.

DESCRIPTION OF THE PREFERRED EMBODIMENT

FIG. 1 shows a block diagram of the hardware system 100 for hybrid TLB fetching according to a first embodiment of the present invention. The processor 110 contains a small number of the most recently used virtual to physical address translations in a primary TLB 120. The primary TLB 120 will typically be implemented with high-speed register files or random-access memory chips (RAMs), and will typically contain between four and 64 table entries. The actual size selected for the primary TLB 120 will depend on the number of memory cycles lost when a desired TLB entry is not found in the primary TLB 120. For example, in a system in which only four memory cycles are lost when a desired TLB entry is not found in the primary TLB 120 (i.e., a low "miss" penalty), the primary TLB 120 will typically hold only 4 entries, while in a system in which sixteen memory cycles are lost when a desired TLB entry is not found in the primary TLB 120 (i.e., a high "miss" penalty), the primary TLB 120 will typically hold 16 to 64 entries.

Figure 2:
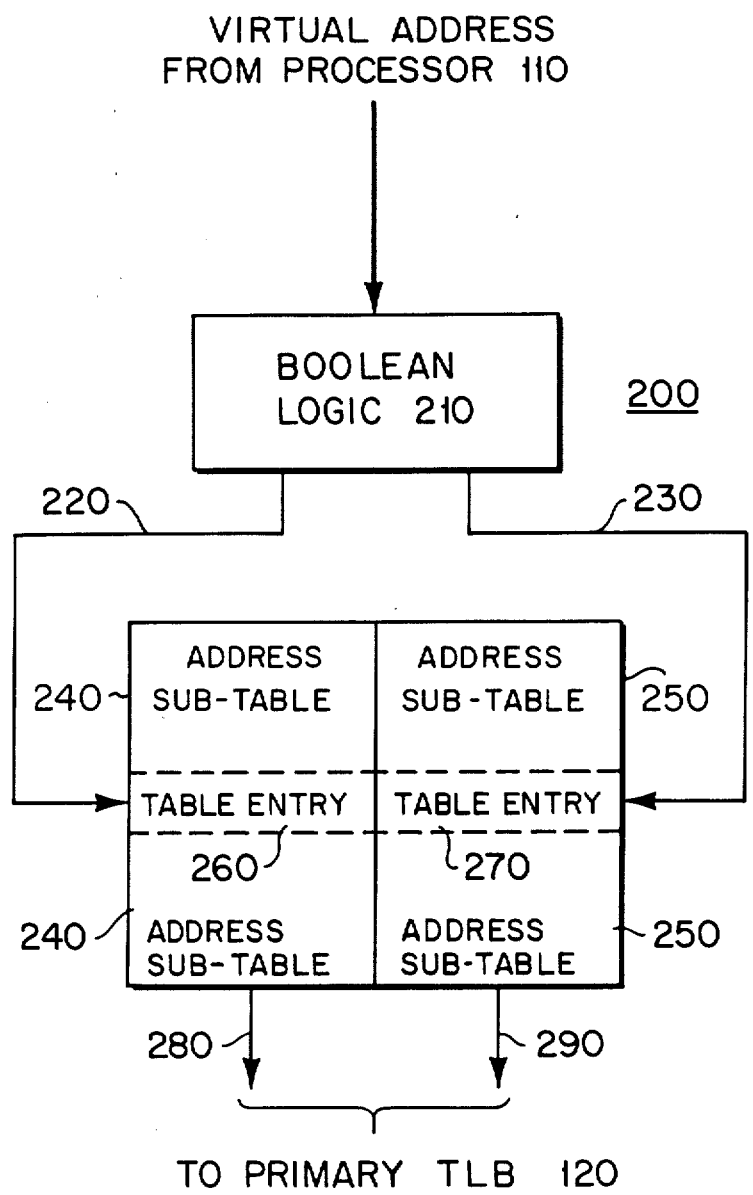
FIG. 2 shows a two-way associative-mapped table for use according to FIG. 1.

Initially, the processor 110 will search for a new address translation directly in the primary TLB 120. If this address translation is found in the primary TLB 120, the processor 110 will use the address translation to generate a physical address and fetch the desired code or data from the physical memory 130 via a main memory bus 140. On the other hand, if the address does not map any of the current entries in the primary TLB 120, conventional state machine fetch hardware 145 within the processor 110 is used to fetch the new translation entry from a secondary TLB 160 via the memory bus 140. The secondary TLB 160 is typically implemented with general purpose RAM. Because access to the secondary TLB 160 is less frequent than access to the primary TLB 120, the secondary TLB 160 can typically be 4 to 16 times slower than the primary TLB 120, and typically can therefore economically contain 16 times the capacity of the primary TLB 120. The secondary TLB 160 can be organized as a direct-mapped table (i.e., each table entry corresponds to one address translation) in order to simplify the complexity of the fetch hardware 145. Alternatively, the secondary TLB 160 may be organized as a two-way associative-mapped table 200 as shown in FIG. 2. In the two-way mapped table 200, the virtual address from the processor 110 is processed by Boolean logic 210, which typically consists of exclusive-OR gates, to generate a pair of indexes 220 and 230 to a pair of address sub-tables 240 and 250, each sub-table 240 and 250 containing one-half of the total secondary TLB entries. The VATT table entry fetch proceeds as follows. A VATT table entry 260 at index 220 of table 240 is transferred to the primary TLB 120. If this first entry 260 does not contain the correct virtual address, the correct virtual address at a second table entry 270 at index 230 of table 250 is transferred to the primary TLB 120.

Figure 3:
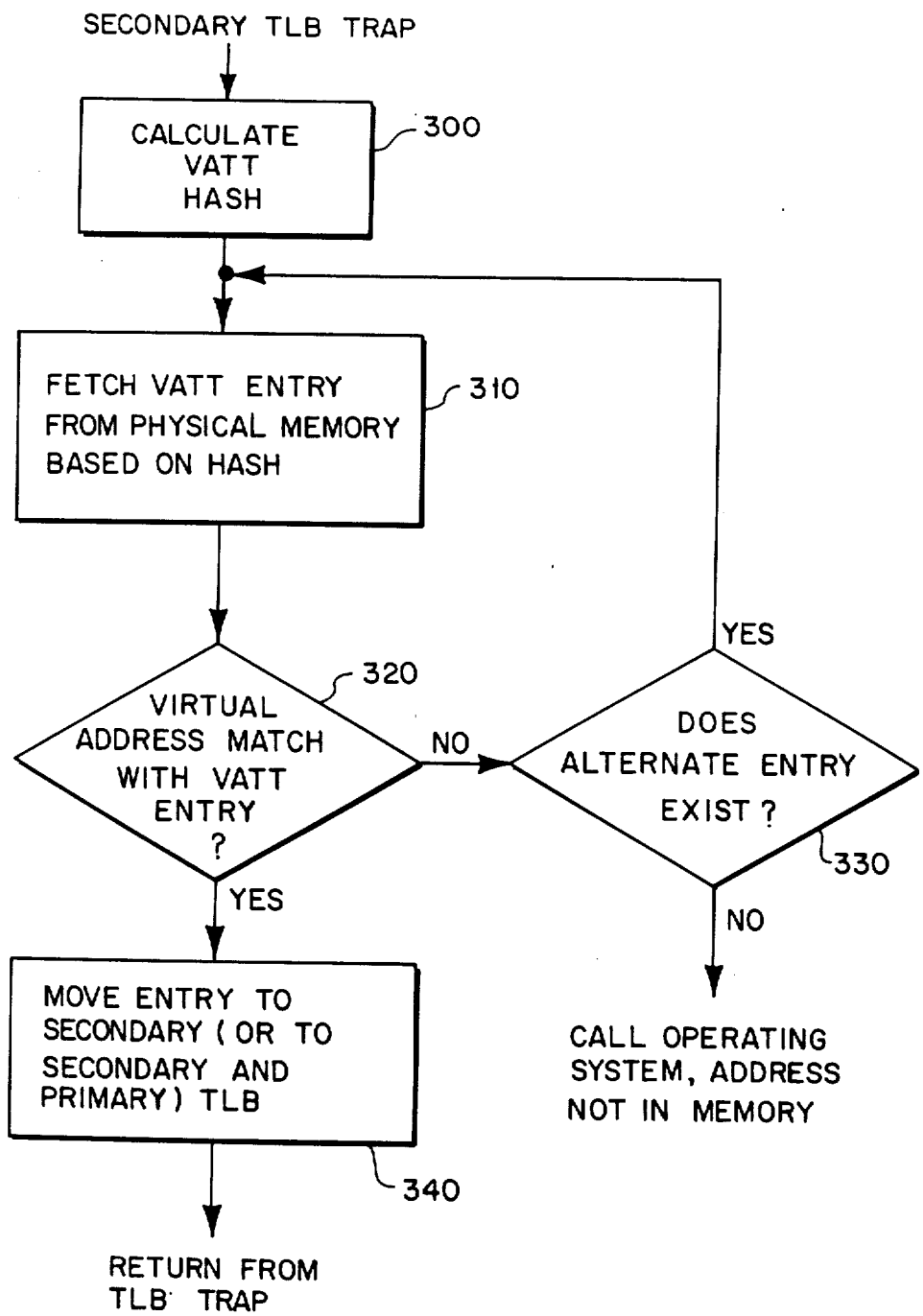
FIG. 3 shows a flow chart for the software according to a preferred embodiment of the present invention.

Referring again to FIG. 1, after the new translation entry from the secondary TLB 160 is transferred via memory bus 140 to the fetch hardware 145, the new entry is used to update the primary TLB 120 so that the processor 110 can use the new entry to fetch the indicated code or data from the memory 130 via the memory bus 140. If the new virtual address translation is not contained in the relatively large secondary TLB 160, a processor trap is generated by the TLB fetch hardware 145 to interrupt the processor 110. During this trap, software as shown in FIG. 3 within the processor 110 transfers the desired data from a Virtual Address Translation Table (VATT) 170 to the secondary TLB 160 or to both the primary TLB 120 and the secondary TLB 160. The VATT 170 should be large enough to hold the entire address translation table, as well as a hashing table of desired complexity, and will typically be at least 4 times slower than the secondary TLB 160 because of the complexity involved in using a hash table. Once the new virtual address translation is finally received by the processor 110, the software returns from the trap of the processor 110 and the processor 110 re-executes the instruction which caused the trap.

A second embodiment of the hardware system 400 for hybrid TLB fetching is shown in FIG. 4. In contrast to the embodiment shown in FIG. 1 in which the primary TLB 120 is located in the memory 130, the system 400 utilizes a separate secondary TLB 410 connected to a processor 415 via a separate TLB bus 420. The separate secondary TLB 410 is ordinarily more expensive to implement than that shown in FIG. 1 due to the added cost of a separate memory module and the added complexity of the TLB bus 420, but the system 400 is capable of higher performance since the speed of the memory elements within the secondary TLB 410 can be selected independently of the speed of the memory elements within memory 430 and VATT 440, and the speed of the TLB bus 420 can be tailored independently of the speed of the main memory bus 450 and the speed of fetch hardware 460. Further, the secondary TLB 410 can actually be located immediately adjacent to or actually within the processor 415, to further increase performance if desired.

As shown in FIG. 3, after a secondary TLB trap is encountered, the software calculates a VATT hash table entry to determine a VATT index from the physical memory 130, as shown in flowchart step 300. A VATT entry is then fetched from the physical memory 130 based on the hash table entry, as shown in flowchart step 310. A comparison is made between the virtual address from the processor 110 and the VATT entry, as shown in flowchart step 320. If the comparison is valid, the VATT entry is moved from the physical memory 130 to the secondary TLB 160 (or to both the primary TLB 120 and to the secondary TLB 160) as shown in flowchart step 340 and the software returns from the secondary TLB trap and the processor hardware 110 re-executes the instruction which caused the trap. On the other hand, if the comparison between the virtual address from the processor 110 and the VATT entry is not valid, a test is performed to determine if an alternate hash table entry exists, as shown in flowchart step 330. If one or more such an alternate VATT entries exist, each entry is in turn tested to determine if the virtual address from the processor 110 and the VATT are equal. However, if no alternate VATT entry exits, or after all available alternate VATT entries have been exhausted, a fault trap is made to a page in the memory to execute operating system software to report that the desired address does not exist in the physical memory 130. Because the most recent address translations reside in the high speed primary TLB 120, memory accessing can be done very quickly (typically in a single processor cycle) with a minimum of hardware. In addition, because transfers from the VATT 170 to the secondary TLB 160 are relatively infrequent (typically less than 0.1 percent of the time) and because the VATT-to-secondary TLB transfers occur in software, the complexity and size of the VATT 170 does not significantly effect the performance or complexity of the processor 110.

What is claimed is:

1. A computer system in which virtual addresses, used by programs executed by the computer system, are translated to physical addresses in order to access physical memory locations in memory storage devices within the computer system, said system comprising:
   a processor comprising
      a primary translation look-aside buffer containing a first set of data representative of a first set of recently used virtual-to-physical address translations and
      TLB fetch hardware coupled to the primary translation look-aside buffer; and
   a physical memory coupled to the processor by a first bus, said physical memory comprising
      a secondary translation look-aside buffer coupled to the first bus for providing a second set of data to the processor, said second set of data representative of a second set of virtual-to-physical address translations, and
      a virtual address translation table means coupled to the secondary translation look-aside buffer for providing a third set of data to the processor, said third set of data representative of all virtual-to-physical address translations needed to access data located in the physical memory;

wherein when the processor searches for a virtual-to-physical address translation in order to use the virtual-to-physical address translation to access a physical memory location, the processor will obtain the virtual-to-physical address translation from the primary look-aside buffer when the virtual-to-physical address translation is in the primary look-aside buffer, and when the virtual-to-physical address translation is not in the primary look-aside buffer, the TLB fetch hardware will fetch data from the secondary translation look-aside buffer when the virtual-to-physical address is in the secondary translation look-aside buffer, and when the virtual-to-physical address translation is not in the secondary translation look-aside buffer, the TLB fetch hardware will generate a trap after which the processor will search the virtual address translation table using software.

2. A computer system as in claim 1, wherein the virtual address translation table means comprises hashing means for distributing virtual address entries throughout allocated portions of the physical memory.

3. A computer system as in claim 3, wherein the hashing means comprises a hashing function located in software.

4. A computer system as in claim 1, wherein the memory access speed of the primary translation look-aside buffer is greater than the memory access speed of the secondary translation look-aside buffer.

5. A computer system as in claim 4, wherein the memory size of the primary translation look-aside buffer is less than the memory size of the secondary translation look-aside buffer.

6. A computer system as in claim 1, wherein the third set of data comprises a set of virtual addresses corresponding to a set of physical addresses located in the physical memory.

7. A computer system in which virtual addresses, used by programs executed by the computer system, are translated to physical addresses in order to access physical memory locations in memory storage devices within the computer system, said system comprising:

a processor comprising a primary translation look-aside buffer containing a first set of data representative of a first set of recently used virtual-to-physical address translations and TLB fetch hardware coupled to the primary translation look-aside buffer;

a secondary translation look-aside buffer coupled to the primary translation look-aside buffer by a TLB bus for providing a second set of data to the processor, said second set of data representative of a second set of virtual-to-physical address translations; and a physical memory coupled to the processor by a first bus, said physical memory comprising a virtual address translation table means coupled to the secondary translation look-aside buffer for providing a third set of data to the processor, said third set of data representative of all virtual-to-physical address translations needed to access data located in the physical memory;

wherein when the processor searches for a virtual-to-physical address translation in order to use the virtual-to-physical address translation to access a physical memory location, the processor will obtain the virtual-to-physical address translation from the primary look-aside buffer when the virtual-to-physical address translation is in the primary look-aside buffer, and when the virtual-to-physical address translation is not in the primary look-aside buffer, the TLB fetch hardware will fetch data from the secondary translation look-aside buffer when the virtual-to-physical address is in the secondary translation look-aside buffer, and when the virtual-to-physical address translation is not in the secondary translation look-aside buffer, the TLB fetch hardware will generate a trap after which the processor will search the virtual address translation table using software.

8. A computer system as in claim 7, wherein the virtual address translation table means comprises hashing means for distributing virtual address entries throughout allocated portions of the physical memory.

9. A computer system as in claim 8, wherein the hashing means comprises a hashing function located in software.

10. A computer system as in claim 7, wherein the memory access speed of the priary translation look-aside buffer is greater than the memory access speed of the secondary translation look-aside buffer.

11. A computer system as in claim 10, wherein the memory size of the primary translation look-aside buffer is less than the memory size of the secondary translation look-aside buffer.

12. A computer system as in claim 7, wherein the third set of data comprises a set of virtual addresses corresponding to a set of physical addresses located in the physical memory.

13. A method for addressing a physical memory in a computer system, wherein programs executed by the computer system contain virtual addresses which are translated to physical addresses in order to access locations within the physical memory, said method comprising the steps of:

(a) attempting to fetch, by hardware, a virtual-to-physical address translation by a processor from a primary translation look-aside buffer;

(b) attempting to fetch, by hardware, the address translation from a secondary translation look-aside buffer if the address translation is not in the primary translation look-aside buffer; and (c) fetching, using software, the address translation from a virtual address translation table to the secondary translation look-aside buffer if the address translation is not in either of the primary or secondary translation look-aside buffers.

14. A method as in claim 13 further comprising during step (c) the step of (d) interrupting operation of the processor.

15. A method for addressing a physical memory in a computer system, wherein programs executed by the computer system contain virtual addresses which are translated to physical addresses in order to access locations within the physical memory, said method comprising the steps of:

(a) attempting to fetch, by hardware, a virtual-to-physical address translation by a processor from a primary translation look-aside buffer;

(b) attempting to fetch, by hardware, the address translation from a secondary translation look-aside buffer if the address translation is not in the primary translation look-aside buffer; and (c) fetching, using software, the address translation from a virtual address translation table to both the primary translation look-aside buffer and the secondary translation look-aside buffer if the address translation is not in either of the primary or secondary translation look-aside buffers.

16. A method as in claim 15 further comprising during step (c) the step of (d) interrupting operation of the processor.

* * * * *